United States Patent [19]

Shimp et al.

[11] Patent Number: 4,781,934

[45] Date of Patent: Nov. 1, 1988

[54] PROCESS AND COMPOSITION FOR CURING MEAT

[75] Inventors: Lawrence A. Shimp, Golden, Colo.; Raimond Pals, Howell, N.J.

[73] Assignee: FMC Corporation, Philadelphia, Pa.

[21] Appl. No.: 864,235

[22] Filed: May 19, 1986

[51] Int. Cl.$^4$ ................................................ A23B 4/02
[52] U.S. Cl. .................................. 426/264; 426/266; 426/641; 426/652
[58] Field of Search ............... 426/264, 266, 281, 332, 426/641, 646, 652

[56] References Cited

U.S. PATENT DOCUMENTS

| | | | |
|---|---|---|---|
| 2,735,777 | 2/1956 | Meyer | 426/332 |
| 2,823,132 | 2/1958 | Sair | 426/652 |
| 2,937,094 | 5/1960 | Rupp et al. | 426/264 |
| 3,028,246 | 4/1962 | Oliver al. | 426/264 |
| 3,104,978 | 9/1963 | Elder | 426/652 |
| 3,139,347 | 6/1964 | Sair et al. | 426/281 |
| 3,401,046 | 9/1968 | Mahon | 426/652 |
| 3,552,978 | 1/1971 | Inklaar | 426/281 |
| 3,595,679 | 7/1971 | Schoch et al. | 426/264 |
| 3,741,777 | 6/1973 | Wrobel et al. | 426/281 |
| 3,780,192 | 12/1973 | Danner et al. | 426/266 |
| 3,782,975 | 1/1974 | Zyss | 426/281 |
| 3,966,974 | 6/1976 | Bharucha et al. | 426/266 X |
| 4,315,015 | 2/1982 | Theiler | 426/266 |
| 4,543,260 | 9/1985 | Brotsky | 426/266 |

*Primary Examiner*—Arthur L. Corbin
*Attorney, Agent, or Firm*—Patrick C. Baker; Frank Ianno

[57] ABSTRACT

Pork and other meat products are cured with pickling solutions from which nitrite is effectively exhausted during curing, thereby avoiding nitrosoamine formation, by buffering the solutions at the requisite acid pH with an alkali metal (M) glassy phosphate of the formula $M(PO_2OM)_nOM$ having an M/P mole ratio of 1.188/1 to 1.250/1 and an average chain length (n) of about 8-11.

16 Claims, No Drawings

PROCESS AND COMPOSITION FOR CURING MEAT

BACKGROUND OF THE INVENTION

This invention relates to meat curing processes and to pickling solutions useful therefor.

In the curing of meats it is conventional to employ pickling solutions (brines) based on alkali metal chloride and nitrite ion. The nitrite protects against toxic organisms such as *Clostridium botulinum*, prevents off-flavor and spoilage by inhibiting oxidation of unsaturated fats, and produces nitric oxide which reacts with substances in the meat to form a pleasing red or bright pink "cured meat" color. It is known that nitrite which does not react in the foregoing manner can be acidified to form nitrous acid, which acid then reacts with secondary amine groups of amino acids or amines in the meat to form carcinogenic nitrosoamines. Similarly, the nitrates optionally present in meat curing compositions can be slowly reduced to nitrites by bacteria in the meat. Any residual nitrite from this source also can form nitrosoamines. Nitrosoamine formation from residual nitrite is accelerated by the high temperatures encountered in the frying of bacon. For this reason, bacon requires more attention than other meat products to reduction of residual nitrite, i.e., nitrite remaining in a cured meat product because of failure to react with the meat during the curing process.

Residual nitrite can be eliminated by the addition to pickling solutions of reducing agents, such as sodium erythorbate. These agents accelerate the curing by reducing nitrite to nitric oxide which either reacts with myoglobin of the meat to form red pigment or leaves the pickle or the meat as a gas. Large proportions of reducing agent, however, can cause too great a loss of nitrite, resulting in lack of protection against toxic organisms, poor meat color and spoilage. Accordingly, the preferred method of eliminating or reducing residual nitrite is to lower the pH of the cured meat product by buffering the pickling solution at a pH of 6.0 or less, using a suitable buffering agent such as an inorganic phosphate. The lower pH favors the formation of products which do not promote nitrosoamine formation. The pH, however, cannot be lowered less than 5.5 because, by so doing, too much of the nitrite is decomposed and is lost from the solution as a gas or other decomposition product. The pickling solution is then considered unstable and cannot be used effectively. Lowered nitrite content also reduces protection against *C. botulinum* and other toxic microorganisms. Experience has shown that the most desirable pickle solution pH for eliminating or minimizing residual nitrite in cured meat products is in the range of 5.5 to 6.0, more preferably 5.65 to 5.9.

The patent literature describes a variety of approaches for the curing of meat products involving the use of pickling solutions containing inorganic phosphates. U.S. Pat. No. 2,823,132 to Sair discloses a pickling solution containing an ascorbate and sodium hexametaphosphate and having a pH of 4.8; this solution is said to be unsuitable due to a lack of storage stability. U.S. Pat. No. 3,104,978 to Elder discloses the use of hydrated crystalline and glassy phosphates in meat curing compositions wherein the phosphate has a $Na_2O/P_2O_5$ ratio of between about 1.8/1 and 1.95/1. U.S. Pat. No. 3,741,777 to Wrobel et al teaches meat curing pickles containing a polyphosphate having a $Na_2O/P_2O_5$ ratio of about 0.9/1 to 2.0/1, such as sodium hexametaphosphate (SHMP) or a combination of SHMP and sodium tripolyphosphate (STPP). U.S. Pat. No. 3,780,192 to Danner et al teaches the use, generally, of food phosphates in meat curing processes. U.S. Pat. No. 3,782,975 to Zyss teaches the use of potassium phosphates for meat curing. U.S. Pat. No. 3,595,679 to Schoch et al is similar to Wrobel et al in the teaching of meat curing pickles containing an edible polyphosphate such as SHMP alone or admixed with STPP. U.S. Pat. No. 4,315,015 to Theiler reviews the problem of residual nitrite and relationship to pickle solution pH. STPP is disclosed as a suitable buffering agent to stabilize the nitrite in the curing solution. U.S. Pat. No. 3,966,974 to Bharucka et al advocates the use of organic nitrites to avoid nitrosoamine formation in meat curing processes. U.S. Pat. No. 3,401,046 to Mahon uses a hydratable phosphate such as STPP, fully hydrated by a sodium nitrite solution, in a meat curing composition, wherein the $Na_2O/P_2O_5$ ratio of the phosphate is about 1.67/1 to about 3/1. In addition, a commercial product comprising a 95/5% by weight blend of SHMP and sodium bicarbonate, presumably the subject of U.S. Pat. No. 4,543,260, has been promoted for its ability to reduce nitrite in bacon by producing a more acidic condition than is achieved by conventional alkaline phosphates.

The most successful curing pickles represented by the foregoing patents and commercial practice are those employing mixtures of two or more phosphates or a mixture of a glassy phosphate and an alkaline material such as sodium bicarbonate. Such mixtures, however, require careful attention to the mixing process to avoid errors in mixing proportions, to avoid segregation or caking of components during mixing or storage, and to minimize decomposition of one or more of the materials. Furthermore, the mixing is an additional step which adds to the complexity and cost of the total meat curing process.

SUMMARY OF THE INVENTION

It has now been found that a single glassy phosphate can be used as the phosphate component of nitrite ion containing pickling solutions to maintain the pH of the solutions in the optimal range for nitrite depletion in the curing of meat products. The glassy phosphate can be represented by the structural formula (I):

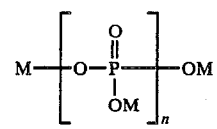

where M is an alkali metal, such as lithium, sodium or potassium, and n is a positive integer representing an average chain length of from about 8 to about 11, preferably about 10, and the M/P mole ratio of the phosphate is 1.188/1 to 1.250/1. Preferably, the M/P ratio is 1.219/1 to 1.250/1 if the phosphate is to be stored for extended periods of time prior to use in a pickling solution, e.g., more than several months. Phosphates of the preferred M/P ratios are more resistant to hydrolysis.

By use of a glassy phosphate of formula I, the pickling solutions may be buffered effectively in the pH range of 5.5 to 6.0 while also maintaining the solution in a stable condition for a useful period prior to and during the curing of meat. The buffering is effective without addition of another material, alkaline or acidic, thus avoiding the additional costs and propensity for errors in mixing that may plague known curing processes. It will be understood, however, that other buffering agents, including phosphates, may be added if desired.

One aspect of the invention, therefore, is a meat curing process wherein a meat product is contacted with an aqueous pickling solution containing an alkali metal chloride, nitrite ion and an amount of a glassy phosphate effective to buffer the solution at a pH in the range of 5.5 to 6.0, wherein the phosphate (formula I above) has an M/P ratio of 1.188/1 to 1.250/1 and M is an alkali metal.

In another aspect of the invention, a pickling solution effective for meat curing is provided, wherein the solution contains an alkali metal chloride, nitrite ion, and an amount of a glass phosphate of formula I above sufficient to buffer the solution at a pH in the range of 5.5 to 6.0.

The foregoing and other aspects, features and advantages of the invention are further described in the specification which follows.

DETAILED DESCRIPTION

Glassy phosphates of formula I above are food grade (edible) materials which may be prepared by known techniques, for example directly by drying an alkali metal orthophosphate solution (the reaction product of soda ash and phosphoric acid) followed by fusion, or indirectly by drying and then fusing in an appropriate ratio a mixture of alkali metal phosphates which individually have M/P mole ratios outside the required ratio. In either case, the melts are rapidly chilled and the solidified masses crushed or ground to a desired particle size. The M/P mole ratio is monitored on the phosphate feed solution to the dryer, with suitable adjustment of the ratio by addition of alkali metal carbonate.

The foregoing and other aspects and variations on the synthesis of glassy phosphates are well known, as described, for example, in U.S. Pat. No. 2,547,047 to Mackenzie and U.S. Pat. Nos. 3,130,002; 3,127,238 and 3,338,670 to Fuchs. The disclosures of these patents are incorporated herein by reference.

For good handling characteristics of the glassy phosphate, including high rates of solubilization in the pickling solution (5 minutes or less when 36 g. of phosphate is agitated at 100 rpm in 300 g. water—Calgon dissolution test), a particle size smaller than 40 mesh (U.S.) is desirable. A preferred particle size distribution is 100% smaller than 40 mesh, no more than about 50% being smaller than 100 mesh and no more than about 25% being smaller than 200 mesh.

The meat products treatable by the process of the invention are any meats or meat derivatives curable by contact with nitrite containing pickling solutions. Intact pork products are the principal meat products benefitted by the invention, including bacon, ham and pork loin, but the invention is also applicable to the production of beef, lamb and other meat products, including chopped, comminuted or mixed meats, such as corned beef, pastrami, sausage, frankfurters, bologna, salami and the like.

In the usual pickling process the pickle solution, containing as essential ingredients an alkali metal chloride, nitrite and phosphate buffer, is injected into the meat either by stitch pumping (injection into tissues through a plurality of closely spaced hollow needles) or by arterial pumping (injection into the vascular system through a hollow needle inserted, for example, in the femoral artery). Alternatively, the meat can be dipped or soaked in the pickling solution for a time sufficient to penetrate the meat. Other methods of contacting a meat product with the pickle solution can be employed, in accordance with procedures well known in the art.

The amount of alkali metal chloride in the pickle may vary according to the method of pickling, the volume of the meat to be cured and other considerations known to the practitioner. From about 1 to about 20% by weight of alkali metal chloride in the solution is a practical range, more preferably about 2–15% by weight, but other concentrations may be used in order to provide the desired salt content in the processed meat.

The amount of nitrite must be more closely controlled, however, in order to optimize its benefits while keeping the excess (residual, unreacted) nitrite as low as possible. The concentration of nitrite in the pickling solution will also depend on governmental regulations and on the mode of pickling, lower concentrations being possible if an injection method is used. For commercial bacon, the objective is to produce a pickled meat product containing 156 ppm by weight of nitrite or 120 ppm by weight of nitrite with 550 ppm ascorbate or erythorbate, although a modification of U.S. Department of Agriculture regulations has been proposed to reduce the nitrite content requirement to 100 ppm. A typical nitrite concentration in a pickling solution intended for injection into pork bellies by stitch pumping is about 0.01 to about 0.5% by weight, preferably about 0.05 to about 0.15% by weight, as sodium nitrite. Other concentrations can be used for other nitrites, e.g., potassium nitrite or the organic nitrites of U.S. Pat. No. 3,966,974 (incorporated herein by reference).

As indicated above, the pH of the pickling solution should be maintained at 5.5 to 6.0, preferably 5.65 to 5.9, for good solution stability and for optimum depletion of nitrite by reaction with the meat, with concomitant elimination or minimization of residual nitrite in the pickled meat-product. The amount of glassy phosphate buffer effective for this purpose will, of course, vary according to Government regulations concerning the amount of phosphate permitted in meat and the type of meat and pickling conditions, including pickling temperature, pickling method, duration of contact with the pickling solution, the type of nitrite, and other ingredients of the pickling solution such as sugars, spices, and curing accelerators, e.g., ascorbic or erythorbic acid and salts thereof in amounts of about 0.1–1.0 wt. % on total solution weight.

If erythorbate is present in the pickle solution, a pH of 5.65 or higher is preferred, because erythorbate reacts with nitrite at lower pH to impart an undesirable brown color to the solution in less than twelve hours. Generally, for the pickling of pork bellies with a pickle containing about 2.0–15.0 wt. % sodium chloride and 0.01–0.5 wt. % sodium nitrite, preferably 0.05–0.15 wt. %, the amount of glassy phosphate will range about 0.5–15 wt. % of total pickling solution, preferably about 2.0–5.0 wt. %. Relative to the maximum of 0.5 wt. % phosphate permitted in finished meat by the United States Department of Agriculture, the pickling solution may contain up to 5.0 wt. % phosphate and up to 0.65 wt. % erythorbate if the pickling solution is injected or otherwise absorbed into the meat to the extent of 10% of meat weight. Higher pickling solution contents on meat weight will, of course, require correspondingly lower phosphate and erythorbate concentrations in the pickling solution.

In addition to the ingredients already mentioned, other materials which optionally may be added to the pickling solution include lecithin to improve separability of bacon slices (U.S. Pat. No. 3,741,777), cured color stabilizers such as 2,3-dihydroxy-2-cyclohexene-1-one (U.S. Pat. No. Re. 26,040), accelerators such as iron or iron salts (U.S. Pat. No. 3,780,192), pH modifiers including alkalis, e.g., sodium carbonate and sodium bicarbonate, organic nitrites, and the various other additives well known in the art as described, for example, in the foregoing patents and in articles on food additives and meat products in Kirk-Othmer, *Encyclopedia of Chemical Technology*, third edition, vols. 11 and 15, respectively.

Other details and steps in the meat curing process, including preparation of the meat product for curing, the duration and temperature of pickling, and optional subsequent processing such as cold storage, heating, smoking, heating and smoking, and the like, are well known, as described in many of the above-cited patents and publications, and require no further description.

The invention is further illustrated in the following non-limiting examples.

EXAMPLE 1

(Comparative)

A glassy sodium phosphate having an Na/P mole ratio of 1.297/1 was formulated in a standard pickle having the following composition:

|  | Wt. % |
| --- | --- |
| Phosphate | 4.6 |
| Saturated NaCl solution | 43.6 |
| Water | 44.8 |
| Sugar (converted corn syrup) | 6.4 |
| Sodium erythorbate | 0.5 |
| Sodium nitrite | 0.1 |
|  | 100.0 |

Although the color of the formulation was stable, the pH was 6.15 and therefore the Na/P ratio was too high for preventing formation of undesirable levels of nitrosoamine upon frying of bacon samples pickled with the formulation.

EXAMPLE 2

(Comparative)

A glassy sodium phosphate having an Na/P mole ratio of 1.084/1 was prepared, formulated and the pickle pH measured as in Example 1. The pH was 5.35 and therefore the Na/P mole ratio was too low for effective use of the phosphate in the pickling of bacon. Also, the pickle turned dark red in 8 hours, indicating instability.

EXAMPLE 3

A glassy phosphate having an Na/P mole ratio of 1.188/1 was prepared, formulated and the pickle pH measured as in Example 1. The pH was 5.70 and the pickle color was acceptable, indicating that the Na/P mole ratio would be effective for preventing formation of undesirable levels of nitrosoamine upon frying of bacon samples pickled with the formulation.

EXAMPLE 4

A glassy phosphate having an Na/P mole ratio of 1.250/1 was prepared, formulated and the pickle pH measured as in Example 1. The pH was 5.90 and the pickle color was acceptable, indicating that the Na/P mole ratio would be effective for control of nitrosoamine formation, as in Example 3.

EXAMPLE 5

The procedure of Example 3 was repeated but using a glassy phosphate (same initial 1.188/1 Na/P mole ratio) partially hydrolyzed by storage prior to formulation into the pickle. The pickle formulation pH was 5.53, still an acceptable value for preventing formation of undesirable nitrosoamine levels in fried bacon pickled with the formulation. The pickle color was acceptable.

EXAMPLE 6

The procedure of Example 4 was repeated but using a glassy phosphate (same initial 1.250/1 Na/P mole ratio) partially hydrolyzed by storage prior to pickle formulation. The pickle pH was 5.75, demonstrating that the glassy phosphate would be effective for control of nitrosoamine formation in fried bacon pickled with the formulation. The pickle color was acceptable.

We claim:

1. A meat curing process comprising contacting a meat product with an aqueous pickling solution containing an alkali metal chloride, nitrite ion and an amount of a glassy phosphate effective to buffer the solution at a pH in the range of 5.5 to 6.0, said phosphate having an M/P mole ratio of 1.188/1 to 1.250/1 wherein M is an alkali metal.

2. The process of claim 1 wherein the phosphate has an M/P mole ratio of 1.219/1 to 1.250/1.

3. The process of claim 1 wherein the nitrite ions are supplied by an alkali metal nitrite, the solution additionally contains an alkali metal erythorbate, and the amounts of the ingredients are as follows:
alkali metal chloride: 2.0–15.0 wt. %
nitrite: 0.05–0.15 wt. %
glassy phosphate: 2.0–5.0 wt. %
alkali metal erythorbate: 0.1–0.65 wt. %
water: to make 100 wt. %

4. The process of claim 3 wherein the alkali metal of the ingredients of the solution is sodium.

5. The process of claim 4 wherein the solution additionally contains sugar.

6. The process of claim 3 wherein the alkali metal of the ingredients is sodium and the glassy phosphate buffer has an Na/P mole ratio in the range of 1.219/1 to 1.250/1.

7. A meat curing composition comprising an aqueous pickling solution containing an alkali metal chloride, nitrite ion, and an amount of a glassy phosphate sufficient to buffer the solution at a pH in the range of 5.5 to 6.0, said phosphate having an M/P mole ratio of 1.188/1 to 1.250/1 where M is an alkali metal.

8. The composition of claim 7 wherein the glassy phosphate buffer has an M/P mole ratio in the range of 1.219/1 to 1.250/1.

9. The composition of claim 6 wherein the nitrite ions are supplied by an alkali metal nitrite, the solution additionally contains an alkali metal erythorbate, and the amounts of the ingredients are as follows:
alkali metal chloride: 2.0–15.0 wt. %
alkali metal nitrite: 0.05–0.15 wt. % glassy phosphate: 2.0-5.0 wt. % alkali metal erythorbate: 0.1-0.65 wt. % water: to make 100 wt. %

10. The composition of claim 9 wherein the alkali metal of the ingredients of the solution is sodium.

11. The composition of claim 10 wherein the solution additionally contains sugar.

12. The composition of claim 9 wherein the alkali metal of the ingredients is sodium and the glassy phosphate buffer has an Na/P mole ratio in the range of 1.219/1 to 1.250/1.

13. The meat curing process of claim 1 wherein the glassy phosphate has the formula:

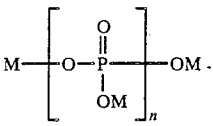

where M is an alkali metal and n is a positive integer representing an average chain length of from about 8 to about 11.

14. The process of claim 13 wherein M is sodium.

15. The composition of claim 7 wherein the glassy phosphate has the formula:

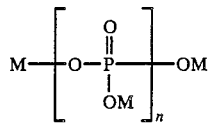

where M is an alkali metal and n is a positive integer representing an average chain length of from about 8 to about 11.

16. The composition of claim 15 wherein M is sodium.

* * * * *